United States Patent Office 3,143,049
Patented Aug. 4, 1964

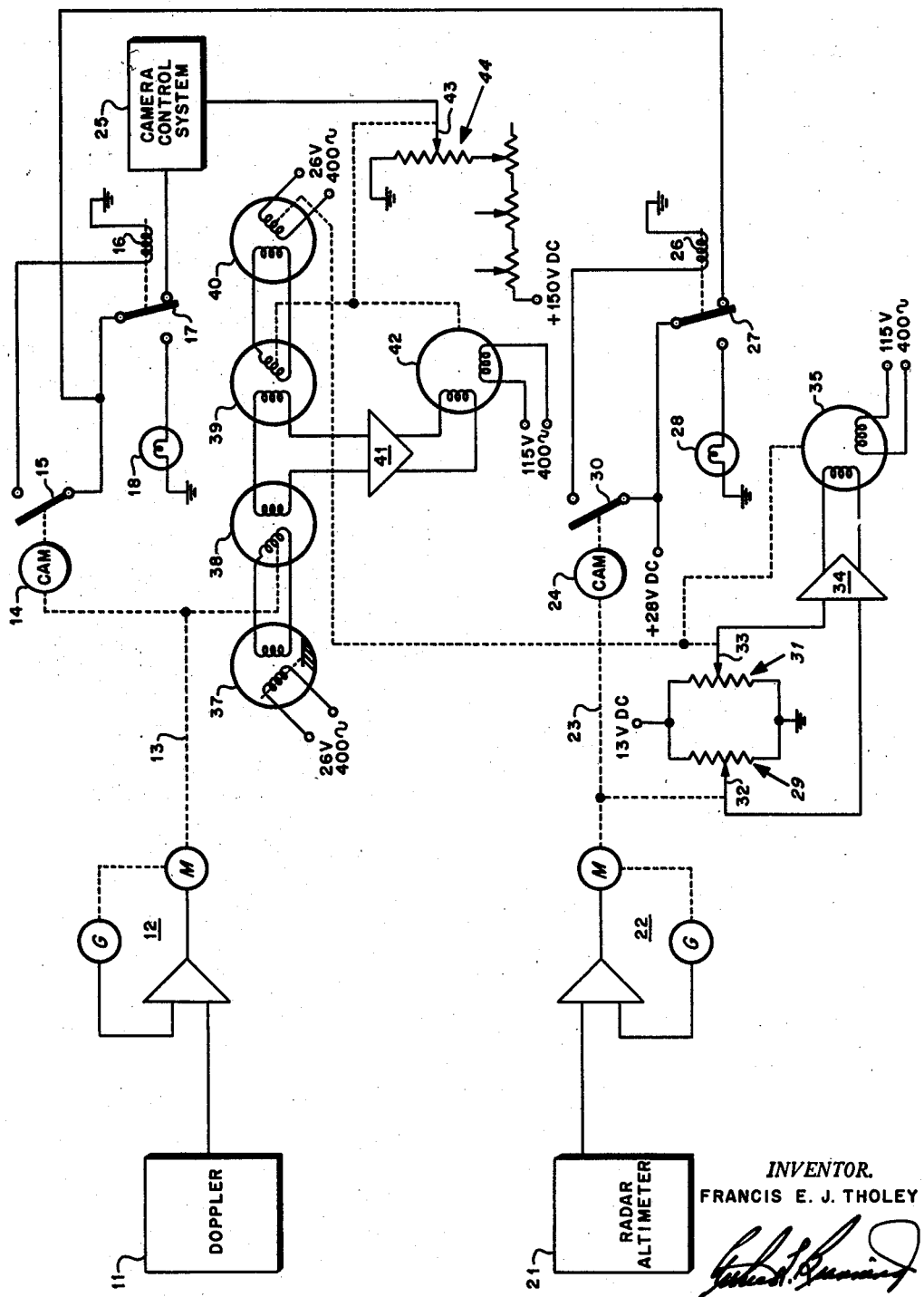

3,143,049
TIME INTERVAL COMPUTER
Francis E. J. Tholey, Hatboro, Pa., assignor to the United States of America as represented by the Secretary of the Navy
Filed Aug. 1, 1961, Ser. No. 128,598
6 Claims. (Cl. 95—12.5)
(Granted under Title 35, U.S. Code (1952), sec. 266)

The invention herein described may be manufactured and use by or for the Government of the United States of America for governmental purposes without the payment of any royalties thereon or therefor.

This invention relates to computer systems and more particularly to a computer system for determining the time interval necessary between exposures of the film in an aerial camera to provide sufficient and constant overlap of photographic frames of the film.

In the field of aerial photography the maintenance of sufficient and constant overlap of photographic frames of film in an aerial camera used in aircraft reconnaissance flight has long been a problem. In order to obtain a sufficient and constant overlap, the time interval between exposures must be controlled in accordance with aircraft velocity and altitude. Presently there are two methods by which this critical time interval based on velocity and altitude of the camera carrying aircraft may be determined. The first method utilizes a photo-electric scanner and is, therefore, limited to daytime use. The second method utilizes a computer in which the inputs of velocity and altitude are manual. The second method requires continual resetting to insure accuracy and is time consuming for the reconnaissance aircraft pilot.

The present invention contemplates a computer for determining the time interval necessary to provide sufficient and constant overlap of photographic frames of cameras used in aircraft reconnaissance flights which is automatic and which continuously provides an output proportional to the required time interval. Since the computer of the present invention utilizes inputs of velocity and altitude obtained from radar units, it is fully capable of accurate nighttime use. The computer of the present invention utilizes electromechanical computer sub-units and provides a D.C. voltage output proportional to the time interval necessary between exposures of the film to insure constant overlap of photographic frames. In addition, the computer of the present invention has means associated with it to deenergize the camera control system when prescribed limits of velocity or altitude are exceeded by the reconnaissance aircraft.

Therefore, it is an object of the present invention to provide a computer for determining the time interval required between film exposures to obtain sufficient and constant overlap of photographic frames in aerial photography operations carried on in aircraft reconnaissance flights.

Another object of the present invention is to provide a computer for automatically determining the time interval necessary between film exposures to obtain sufficient and constant overlap of photographic frames.

A further object of the present invention is to provide a computer for determining the required time interval between film exposures to obtain sufficient and constant overlap of photographic frames which has the capability of both daytime and nighttime use.

Still another object of the present invention is to provide a computer which continuously and automatically determines the required time interval between exposures to obtain sufficient and constant overlap of photographic frames in aircraft reconnaisance flights which has the capability of daytime and nighttime use and which provides a voltage input to a camera control system proportional to the required interval.

Still another object of the present invention is to provide a computer for use with a camera control system of a reconnaissance aircraft camera system which automatically deenergizes the camera control system when the reconnaissance aircraft exceeds a predetermined velocity or altitude.

Other objects and features of the invention will become apparent to those skilled in the art as the disclosure made in the following detailed description of a preferred embodiment of the invention is illustrated in the accompanying sheet of drawing in which the figure illustrates partly in block diagram form and partly in schematic form the computer system of this invention.

Referring now to the figure, there is shown a radar Doppler unit 11 which measures velocity $V_h$ along the heading of an aircraft. Radar Doppler unit 11 has an output signal proportional to the velocity $V_h$. This signal is converted into a mechanical output by means of conventional servo system 12 which displaces shaft 13 accordingly.

Shaft 13, which is rotated to a position proportional to the output of radar Doppler unit 11, is connected to the rotor of linear transformer 38 and displaces the rotor of linear transformer 38 to a position which is proportional to the velocity of the reconnaissance aircraft in the direction of its heading. The output shaft 13 is also connected to a cam 14 which closes limit switch 15 to energize relay coil 16 from a 28 volt D.C. voltage source when displacement of the shaft 13 exceeds a predetermined amount. In this particular case, 50 degrees rotation is made equivalent to 300 knots per hour. The cam 14 is set to close switch 15 when this scale factor of 50 degrees of rotational displacement is exceeded. When relay coil 16 is energized, switch 17 is connected to ground through warning light 18 thereby disconnecting the power supply from the camera control system 25. Thus, the camera control system 25 is operative for aircraft velocities of 300 knots and below.

Radar altimeter 21 which is carried by the reconnaissance aircraft has an output signal proportional to the altitude of the aircraft. This output signal is transformed into a mechanical output via conventional servo loop 22 so that shaft 23 has a position which is proportional to the actual altitude of the aircraft. Shaft 23 is connected to a cam 24 which functions in the same manner as cam 14 to disconnect the power supply from the camera control system. The scale factor for shaft 23 is 55 degrees of rotation which is equivalent to 5,000 feet altitude. Cam 24 is adjusted to close switch 30 to energize relay coil 26 when shaft 23 exceeds the 55 degrees of rotation equivalent to 5,000 feet altitude. Relay coil 26 is energized via the 28 volt D.C. voltage supply which causes the switch 27 to be connected to ground through warning light 28. When warning light 28 is lit it indicates that the 5,000 feet altitude limit has been exceeded. The 28 volt D.C. voltage source is disconnected from camera control system 25 when switch 27 is actuated and the camera control system is deenergized when the altitude of the aircraft exceeds 5,000 feet.

The output of radar altimeter 21 is non-linear in nature and therefore the mechanical output of shaft 23 is non-linear and must be linearized before it can be used as an input to the computer system.

The shaft 23 positions the wiper arm 32 of a nonlinear function potentiometer 29 in accordance with the altitude signal from radar altimeter 21. The voltage from this potentiometer 29 is balanced against the output of linear potentiometer 31. The resistances of each potentiometer are connected in parallel across the same voltage.

Any difference in voltage on the wiper arms 32 and 33 of potentiometers 29 and 31 is fed as an input to servo amplifier 34 where it is amplified and serves as an input to the control coil of servo motor 35, the other coil of which receives a constant input of 115 volts at 400 cycles. The output from servo amplifier 34 causes motor 35 to position shaft 36 a proportional amount. Therefore, the output or position of shaft 36 is linearly proportional to the altitude of the aircraft. At the same time the shaft 36 moves wiper arm 33 to rebalance potentiometer 31 with potentiometer 29 to null out the input to servo amplifier 34.

The shafts 13 and 36 supply mechanical inputs proportional to $V_h$ and $h$ to the computer of this invention.

To provide a voltage proportional to the time interval necessary between film exposures to obtain sufficient and constant overlap of photographic frames of an aerial camera carried by an aircraft reconnaissance aircraft the equation to be solved is:

$$T = \frac{1}{t} = K\frac{V_h}{h}$$

where $T$ = the reciprocal to $t$ or the time interval between frames
$K$ is a constant of proportionality
$V_h$ = velocity of the reconnaissance aircraft along its heading
$h$ = altitude For purposes of computation, the above equation is rearranged to be the equation $KV_h = Th$. By forcing the solution of the equation $KV_h = Th$, that is by making one side equal to the other side a solution for T may be obtained. The manner in which this equation is solved is discussed hereinbelow.

The computer of this invention comprises four linear transformers 37, 38, 39 and 40, each of which comprises a rotor coil and a stator coil.

The rotor coil of linear transformer 37 is fixed and has supplied to it a constant voltage 26 volts at 400 cycles. The rotor coil of the linear transformer 37 is fixed at such a position that its output represents the K term of the above equation. This output which appears on the stator coil of linear transformer 37 serves as an input to the rotor coil of linear transformer 38. The rotor coil of linear transformer 38 receives a mechanical input from shaft 13 which positions the rotor coil of linear transformer 38 an amount proportional to the velocity $V_h$. The stator coil of linear transformer 38 therefore has an output which is proportional to the quantity $KV_h$. This output serves as an input to one side of output servo amplifier 41.

The rotor coil of linear transformer 40 has a constant voltage input of 26 volts at 400 cycles and a mechanical input from shaft 36 which displaces the rotor coil of linear transformer 40 an amount proportional to the altitude $h$. The output of linear transformer 40 which appears on the stator coil of transformer 40 is proportional to the altitude $h$ and serves as an input to the rotor coil of linear transformer 39. The output which appears on the stator coil of linear transformer 39 serves as an input to the other side of servo amplifier 41. The difference between the two voltage inputs to the amplifier energizes the control winding of motor 42 which positions the rotor coil of linear transformer 39 until it balances the output of linear transformer 38. The energizing winding of motor 42 is connected to a constant source of 115 volts at 400 cycles. This provides the desired solution of the above equation because the amount that the rotor coil of linear transformer 39 is moved is proportional to the quantity T. The quantity T is the amount by which the output of linear transformer 40 has to be multiplied to counterbalance the output of linear transformer 38 to provide zero input to servo amplifier 41. At the same time, motor 42 displaces the wiper arm 43 of potentiometer 44 an amount proportional to the time interval required between film exposures to obtain a sufficient and constant overlap of photographic frames in an aerial camera.

The D.C. voltage proportional to the quantity T on wiper arm 43 is fed as an input to camera control system 25 and therein serves to control the intervals between film exposures accordingly. Thus, when the condition of balance is obtained, the computer supplies the voltage which is used by the camera control equipment to properly set the time interval between photographic exposures.

Various modifications are contemplated and may obviously be resorted to by those skilled in the art without departing from the spirit and scope of the invention as hereinafter defined by the appended claims.

What is claimed is:

1. A computer system for determining the time interval between film exposures necessary to obtain sufficient and constant overlap of photographic frames in an aerial camera for use by a reconnaissance aircraft, comprising in combination: Doppler radar means providing an output signal proportional to aircraft velocity in the heading direction, first shaft means, first servo means connected between said Doppler radar means and said first shaft means converting said output signal proportional to aircraft velocity into a displacement of said first shaft means, radar altimeter means providing an output signal proportional to aircraft altitude, second shaft means, second servo means connected between said radar altimeter means and said second shaft means converting said output signal proportional to aircraft altitude into a linearly proportional displacement of said second shaft means, an electromechanical computer coupled to said first and second shaft means, means included in said electromechanical computer for comparing the respective displacements of said first and second shaft means to provide an output proportional to the ratio of aircraft velocity to aircraft altitude, camera control means, connecting means coupling the output of said electromechanical computer to said camera control means whereby said camera control means is provided with an input proportional to the necessary interval between film exposures.

2. A computer system for determining the time interval between film exposures necessary to obtain sufficient and constant overlap of photographic frames in an aerial camera for use by a reconnaissance aircraft, comprising in combination: Doppler radar means providing an output signal proportional to aircraft velocity in the heading direction, first shaft means, first servo means connected between said Doppler radar means and said first shaft means converting said output signal proportional to aircraft velocity into a displacement of said first shaft means, radar altimeter means providing an output signal proportional to aircraft altitude, second shaft means, second servo means connected between said radar altimeter means and said second shaft means converting said output signal proportional to aircraft altitude into a linearly proportional displacement of said second shaft means, a first linear transformer having the rotor coiled thereof coupled to said first shaft means, a second linear transformer having the rotor coil thereof coupled to said second shaft means, a third linear transformer having the rotor thereof electrically coupled to the stator of said second linear transformer, a servo motor, a servo amplifier having the input circuit thereof coupled to the stator windings of said first and third linear transformers and the output circuit thereof coupled to the control winding of said servo motor, camera control means, a potentiometer having the wiper arm thereof electrically coupled to said camera control means, third shaft means coupling the output shaft of said servo motor to the wiper arm of said potentiometer and to the rotor coil of said third linear transformer whereby said third shaft means positions the rotor coil of said third linear transformer to null the respective voltages induced in the stator windings of said first and third linear transformers to cause the wiper arm of said potentiometer to provide said control means with an input proportional to the necessary time interval between film exposures.

3. In a system for determining the time interval between film exposures necessary to obtain sufficient and constant overlap of photographic frames in an aerial camera for use by a reconaissance aircraft; first shaft means having a displacement continuously proportional to aircraft velocity, second shaft means having a displacement continuously proportional to aircraft altitude, a first linear transformer having the rotor coil thereof coupled to said first shaft means, a second linear transformer having the rotor coil thereof coupled to said second shaft means, a third linear transformer having the rotor thereof electrically coupled to the stator of said second linear transformer, a servo motor, a servo amplifier having the input circuit thereof coupled to the stator windings of said first and third linear transformers and the output circuit thereof coupled to said control winding of said servo motor, camera control means, a potentiometer having the wiper arm thereof electrically coupled to said camera control means, third shaft means coupling the output shaft of said servo motor to the wiper arm of said potentiometer and the rotor coil of said third linear transformer whereby said third shaft means positions the rotor coil of said third linear transformer to null the input to said servo amplifier so that said third shaft means has a displacement proportional to the necessary time interval between film exposures.

4. In a system for determining the time interval between film exposures necessary to obtain sufficient and constant overlap of photographic frames in an aerial camera for use by a reconnaissance aircraft; first shaft means having a displacement continuously porportional to aircraft velocity, second shaft means having a displacement continuously proportional to aircraft altitude, camera control means, a source of voltage, first electrical circuit means connecting said source of voltage to said camera control means, first switch means included in said first electrical circuit means and connected to said first shaft means for disconnecting said source of voltage from said camera control means when said first shaft means is displaced beyond a predetermined amount, second electrical circuit means in series with said first electrical circuit means connecting said source of voltage to said camera control means, second switch means included in said second electrical circuit means connected to said second shaft means for disconnecting said source of voltage from said camera control means when said second shaft means is displaced beyond a predetermined amount, a first linear transformer having the rotor coil thereof coupled to said first shaft means, a second linear transformer having the rotor coil thereof coupled to said second shaft means, a third linear transformer having the rotor thereof electrically coupled to the stator of said second linear transformer, a servo motor, a servo amplifier having the input circuit thereof coupled to the stator windings of said first and third linear transformers and the output circuit thereof coupled to said control winding of said servo motor, a potentiometer having the wiper arm thereof electrically coupled to said camera control means, third shaft means coupling the output shaft of said servo motor to the wiper arm of said potentiometer and to the rotor coil of said third linear transformer whereby said third shaft means positions the rotor coil of said third linear transformer to null the respective voltages induced in the stator windings of said first and third linear transformers to cause the wiper arm of said potentiometer to provide said camera control means with an input proportional to the necessary time interval between film exposures.

5. A computer system for determining the time interval between film exposures necessary to obtain sufficient and constant overlap of photographic frames in an aerial camera for use by a reconnaissance aircraft, comprising in combination: Doppler radar means providing an output signal proportional to aircraft velocity in the heading direction, first shaft means, first servo means connected between said Doppler radar means and said first shaft means converting said output signal proportional to aircraft velocity into a displacement of said first shaft means, camera control means, a source of voltage, first electrical circuit means connecting said source of voltage to said camera control means, first switch means included in said first electrical circuit means and connected to said first shaft means for disconnecting said source of voltage from said camera control means when said first shaft means is displaced beyond a predetermined amount, radar altimeter means providing an output signal proportional to aircraft altitude, second shaft means, second servo means connected between said radar altimeter means and said second shaft means converting said output signal proportional to aircraft altitude into a displacement of said second shaft means, second electrical circuit means in series with said first electrical circuit means connecting said source of voltage to said camera control means, second switch means included in said second electrical circuit means connected to said second shaft means for disconnecting said source of voltage from said camera control means when said second shaft means is displaced beyond a predetermined amount, third shaft means, third servo means connected between said second and third shaft means converting said second shaft displacement into a displacement of said third shaft linearly proportional to said aircraft altitude, an electromechanical computer coupled to said first and third shaft means, means included in said electromechanical computer for comparing the respective displacements of said first and third shaft means to provide an output proportional to the ratio of aircraft velocity to aircraft altitude, connecting means coupling the output of said electromechanical computer to said camera control means whereby said camera control means is provided with an input proportional to the necessary interval between film exposures.

6. A computer system for determining the time interval between film exposures necessary to obtain sufficient and constant overlap of photographic frames in an aerial camera for use by a reconnaissance aircraft, comprising in combination: Doppler radar means providing an output signal proportional to aircraft velocity in the heading direction, first shaft means, first servo means connected between said Doppler radar means and said first shaft means converting said output signal proportional to aircraft velocity into a displacement of said first shaft means, camera control means, a source of voltage, first electrical circuit means connecting said source of voltage to said camera control means, first switch means included in said first electrical circuit means and connected to said first shaft means for disconnecting said source of voltage from said camera control means when said first shaft means is displaced beyond a predetermined amount, radar altimeter means providing an output signal proportional to aircraft altitude, second shaft means, second servo means connected between said radar altimeter means and said second shaft means converting said output signal proportional to aircraft altitude into a displacement of said second shaft means, second electrical circuit means in series with said first electrical circuit means connecting said source of voltage to said camera control means, second switch means included in said second electrical circuit means connected to said second shaft means for disconnecting said source of voltage from said camera control means when said second shaft means is displaced beyond a predetermined amount, third shaft means, third servo means connected between said second and third shaft means converting said second shaft displacement into a displacement of said third shaft linearly proportional to said aircraft altitude, a first linear transformer having the rotor coil thereof coupled to said first shaft means, a second linear transformer having the rotor coil thereof coupled to said third shaft means, a third linear transformer having the rotor coil thereof electrically coupled to the stator coil of said second linear transformer, a servo motor, a servo amplifier having the input circuit thereof coupled to the stator windings of said first and third linear transformers and the output circuit thereof coupled to the control winding of said servo motor, a potentiometer having the wiper arm thereof electrically coupled to said camera control means, fourth shaft means coupling the output shaft of said servo motor to the wiper arm of said potentiometer and to the rotor coil of said third linear transformer whereby said fourth shaft means positions the rotor coil of said third linear transformer to null the respective voltages induced in the stator windings of said first and third linear transformers to cause the wiper arm of said potentiometer to provide said camera control means with an input proportional to the necessary time interval between film exposures.

References Cited in the file of this patent

UNITED STATES PATENTS

| | | |
|---|---|---|
| 2,599,517 | Raspet | June 3, 1952 |
| 2,967,470 | Willits | Jan. 10, 1961 |